(No Model.)
P. HOWARD.
BAKING PAN.
No. 299,475. Patented May 27, 1884.
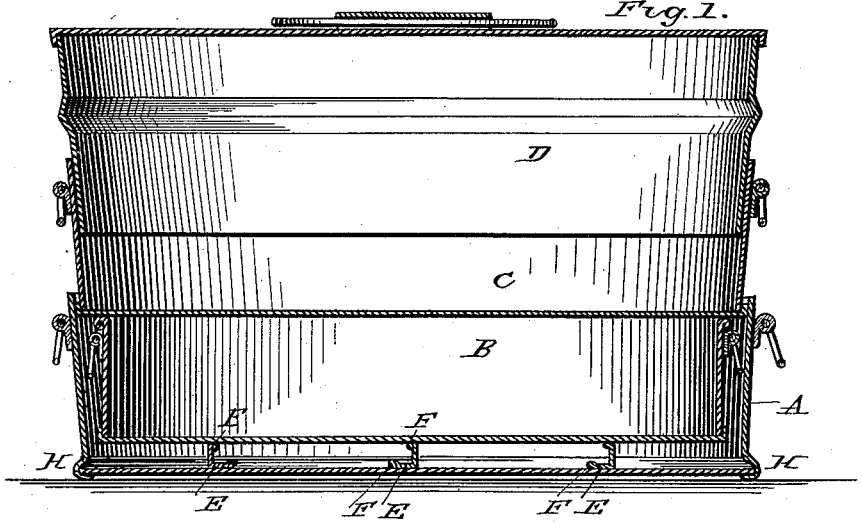
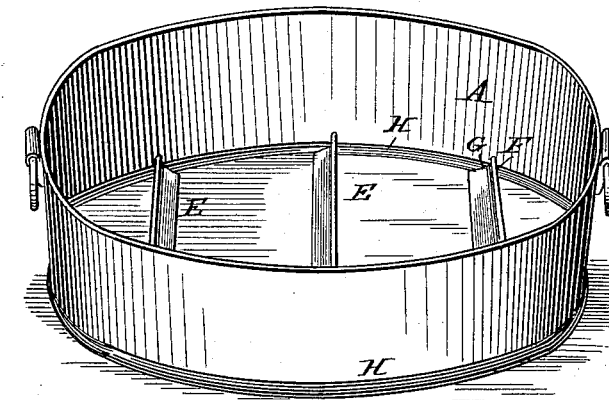
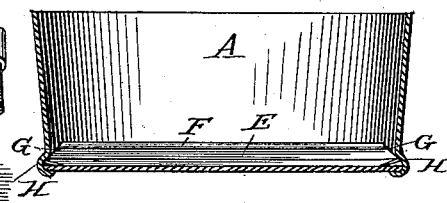
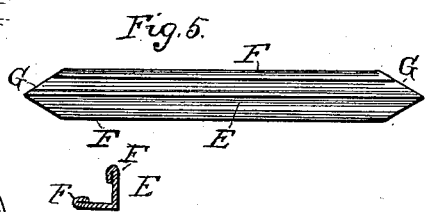
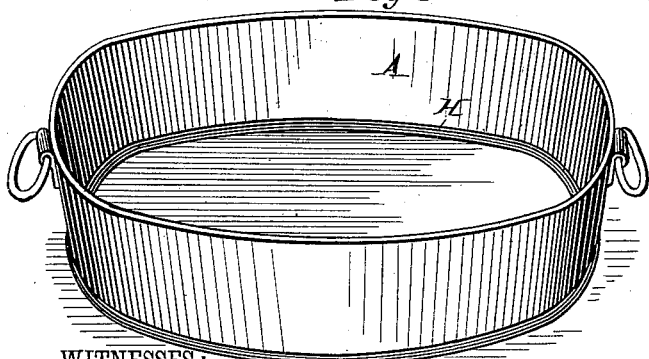
WITNESSES:
Fred. G. Dieterich,
Arthur L. Morsell.
INVENTOR.
Patrick Howard,
by Louis Bagger & Co.
his ATTORNEYS.
N. PETERS, Photo-Lithographer, Washington, D. C.

UNITED STATES PATENT OFFICE.

PATRICK HOWARD, OF PIQUA, OHIO, ASSIGNOR OF ONE-HALF TO DAVID YOUNG, OF SAME PLACE.

BAKING-PAN.

SPECIFICATION forming part of Letters Patent No. 299,475, dated May 27, 1884.

Application filed October 9, 1883. (No model.)

*To all whom it may concern:*

Be it known that I, PATRICK HOWARD, a citizen of the United States, and a resident of Piqua, in the county of Miami and State of Ohio, have invented certain new and useful Improvements in Baking-Pans; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal vertical section of a baking-pan embodying my improvement. Fig. 2 is a perspective view of the pan, showing its removable cleats in position. Fig. 3 is a similar view of the pan, with the cleats removed. Fig. 4 is a cross-section through the pan with one of its cleats, and Fig. 5 is a top view and a cross-section of one of the cleats.

Similar letters of reference indicate corresponding parts in all the figures.

My invention relates more particularly to that class of cooking-utensils in which a series of pans or vessels are superimposed one upon the other, and which are adapted to cook several dishes at one time. This class of utensils is usually provided with a pan or vessel which is especially adapted for the baking or roasting of meats; and my improvement relates to the meat-pan or meat-roaster, as hereinafter more fully described and claimed.

In the accompanying drawings, A denotes the bottom pan or meat-baking pan, and B and C two other pans used in connection therewith, while D represents the cover. The roasting-pan A is provided with a series of cleats, E, made by bending a strip of sheet metal at right angles longitudinally and then doubling the edges, as shown at F. The ends of these cleats are beveled, as shown at G, to adapt them to be wedged into a groove or channel, H, formed in the sides of the pan A, near its bottom. These cleats, of which there may be three or more for each roasting-pan, according to size, are wedged firmly into the bottom of the pan, as will be seen more clearly by reference to Fig. 4, and serve to support the meat placed in the pan to be roasted above the bottom of the same, the meat being placed directly upon the cleats E and being supported thereby, thus preventing the meat from burning, and also permitting the gravy to drop down into the bottom of the pan.

I am aware that pans for roasting meats have been made before with a removable gridiron in the bottom, or with fixed cleats; but the latter are objectionable, because they interfere with the cleaning of the pan, while the removable cleats shown in my invention possess several advantages over a removable gridiron in point of simplicity and cheapness of construction, and in the fact that the number of cleats or supports may be regulated according to the size of the piece or pieces of meat which it is desired to cook at one time in the pan. After removing the removable cleats E F, it will be seen that my pan can readily be cleaned, and the gravy poured out without the least inconvenience.

Having thus described my invention, I claim and desire to secure by Letters Patent of the United States—

1. The combination of the baking-pan A and removable cleats E, consisting each of a strip of sheet metal bent at right angles, with its edges doubled upon itself, substantially as and for the purpose shown and set forth.

2. The combination of the baking-pan A, having a groove or channel, H, near its bottom, and removable cleats E, composed each of a strip of sheet metal bent at right angles, and having the ends cut off or beveled to adapt them to fit into the groove or channel H, substantially as and for the purpose shown and set forth.

In testimony that I claim the foregoing as my own I have hereunto affixed my signature in presence of two witnesses.

PATRICK HOWARD.

Witnesses:
G. A. BROOKS,
J. H. HATCH.